June 24, 1930.                  C. MITCHELL                    1,765,934
                                 PERCOLATOR
                              Filed Jan. 24, 1930
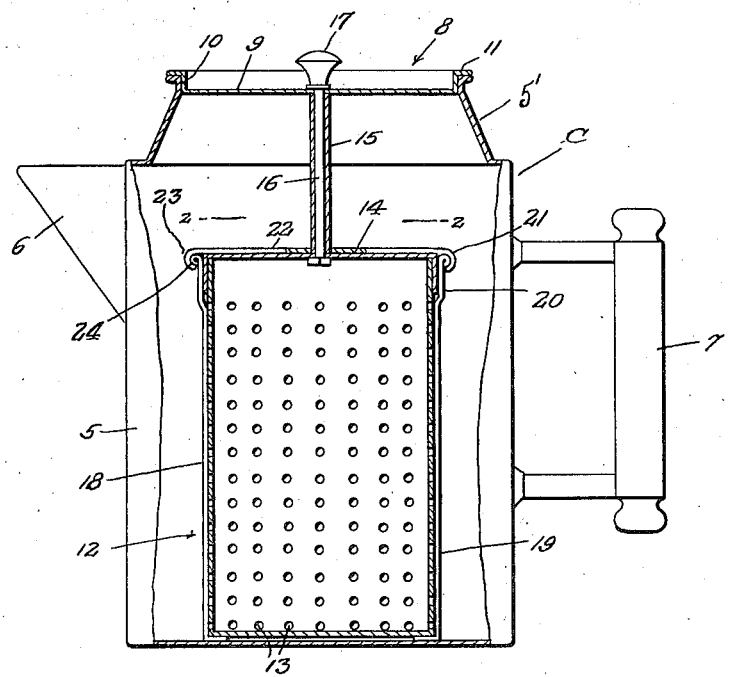
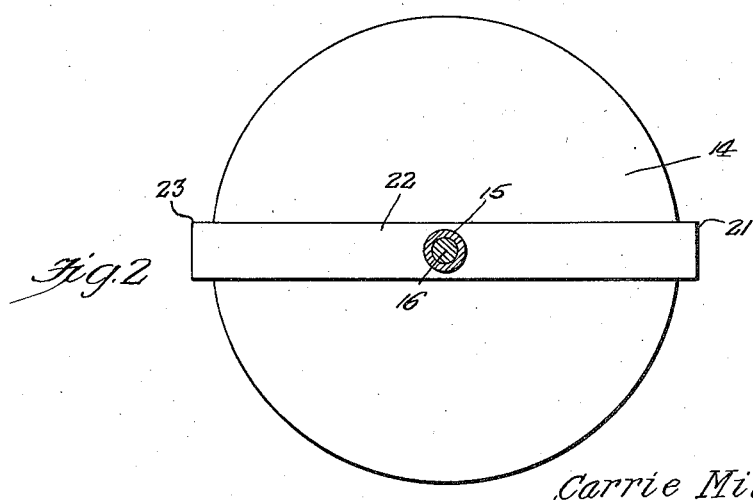
Inventor
Carrie Mitchell,
By Clarence A. O'Brien
                    Attorney Patented June 24, 1930

1,765,934

UNITED STATES PATENT OFFICE

CARRIE MITCHELL, OF LA JUNTA, COLORADO

PERCOLATOR

Application filed January 24, 1930. Serial No. 423,114.

This invention relates broadly to percolators and has more particular reference to such percolators known as domestic percolators, that is, such percolators for making coffee as are used in the kitchens in private homes.

The primary object of this invention is to provide an improved coffee receptacle for disposition within a conventional coffee pot or liquid receptacle of a percolator, and wherein the coffee receptacle will be positioned for rest on the bottom of the coffee pot so as to enable the water in the coffee pot to thoroughly permeate the coffee, thus enhancing and rendering more tasty the coffee made therein.

Other objects and advantages of the invention will become apparent during a study of the following description, taken in connection with the accompanying drawings, wherein:

Figure 1 is a fragmentary detail view taken through a conventional percolator or coffee pot, the same being shown partly in section and partly in elevation and having my improved coffee receptacle arranged therein.

Figure 2 is a detail sectional view taken substantially on the line 2—2 of Figure 1.

With reference more in detail to the drawings, it will be seen that I have designated generally by the reference character C a conventional coffee pot or percolator embodying the cylindrical receptacle portion 5, discharge spout 6, handle 7, and at its upper open end 5' is closed through the medium of a suitable lid designated by the reference character 8.

In this connection, it is to be noted that the lid 8 is preferably in the nature of a disc 9 having an upstanding peripheral wall or flange 10, which flange 10 at its upper edge merges into a lateral annular flange 11 resting on the upper edge of the opened end 5' of the receptacle 5.

The coffee receptacle is designated generally by the reference character 12, and as shown is in the nature of a relatively deep cylinder closed at its bottom and opened at the top. The walls of the cylinder are perforated as at 13. The cylinder 12 as before intimated is adapted to receive the coffee and said cylinder is positioned within the coffee pot to rest on the bottom thereof.

A cover or lid 14 telescopically fits on the upper edge of the said coffee receptacle 12 and rising from the cover 14 is a tube 15. The tube at its opposite ends is open and the cover 14 is suitably apertured at the lower end of the tube. The percolator cover 8 is provided with a central aperture formed therein, and the upper end of the tube 15 is adapted to be disposed against the inner face of the cover 8 in registry with the aperture formed in the cover.

A bolt 16 extends through the tube 15, the head of the bolt bearing against the inner face of the cover 14, and at its free end extends through the aperture in the percolator cover 8. A knob 17 is threaded on this free end of the bolt 6, and thus it will be seen through the medium of this bolt and tube 15, the percolator cover 8 and the coffee receptacle cover 14 are secured together and in spaced relation.

Obviously, then, when the coffee receptacle 12 is disposed with its contents within the coffee percolator and the percolator cover 8 is placed in position, the coffee receptacle cover 14 will also be positioned over the upper end of the coffee receptacle 12 for closing said upper end as clearly shown to advantage in Figure 1.

It is to be noted that the coffee receptacle 12 is of a suitable size relative to the coffee pot or percolator with which it is to be used, so that a sufficient quantity of coffee may be contained therein, and this coffee receptacle having its cylindrical wall perforated will insure a thorough permeation of the boiling water within the percolator through the coffee.

To secure the cover 14 upon its receptacle 12, there is provided a pair of straps 18 and 19, welded or otherwise secured to diametrically opposite sides of the container 12 and extending longitudinally of the container. Each of the straps 18 and 19, which straps may be formed of metal or any other suitable material, at their upper ends are offset laterally as at 20.

An elongated retaining hasp or catch 22, which hasp 22 extends transversely of and is adapted to rest on the cover 14, as suggested in Figure 2, at its opposite ends is curved downwardly and inwardly as at 21 and 23 respectively to provide spring-like clips adapted to engage with the bead or retention head 24 suitably formed on the upper end of the offset 20 of said straps 18 and 19 as shown to advantage in Figure 1.

Manifestly, when the hasp 22 is rotated over the cover 14 and its clip ends 23 engage with the head 24 of the straps 18 and 19, the cover 14 will be securely retained in place upon receptacle 12. Of course, the hasp 22 intermediate its ends will be provided with a suitable opening to accommodate the tube 15 as clearly suggested in the drawings.

It will also be seen that one by grasping the knob 17 to remove the percolator cover 8 will at the same time effect the removal of the coffee receptacle cover 14, and further, it will be seen that by catching hold on the knob 18 and pulling upwardly for removing the cover 8, the receptacle 12 will be drawn up and out of the percolator at the same time.

It is believed that from the foregoing description, taken in connection with the accompanying drawings, a clear understanding of the operation, construction, utility and advantages of a percolator of this character will be had by those skilled in this art without a more detailed description thereof.

Even though I have herein shown and described the preferred embodiment of my invention, it is to be noted that the same is susceptible to changes fully comprehended by the spirit of the invention as herein described, and the scope of the appended claims.

Having thus described my invention, what I wish to claim as new is:

1. In a percolator of the class described, an inner and outer receptacle, said inner receptacle resting on the bottom of said outer receptacle, said receptacles being open at their top, covers for the open top of said receptacles and the walls of said inner receptacle being perforated, a bolt extending through said covers, and a nut threaded on the outer end of said bolt, and a tube disposed about said bolt between said covers.

2. In a percolator of the class described, a receptacle open at its top, a discharge spout for said receptacle, a handle for said receptacle, a cover for the open top of said receptacle, a coffee containing receptacle adapted for disposition within the first mentioned receptacle, said coffee containing receptacle having the walls thereof perforated, said coffee receptacle being open at its top, a cover fitting over the open top of said coffee receptacle, a tube rising from said last mentioned cover, a bolt extending upwardly through said tube and having its upper end extending through the first mentioned cover, and a knob threaded on the upper end of said bolt.

3. In a percolator of the class described, a coffee receptacle adapted for reception into the percolator, said coffee receptacle comprising a perforated cylindrical wall, said coffee receptacle being closed at the bottom and open at its top, a cover for the open top of said coffee receptacle, strap members secured to said coffee receptacle at diametrical opposite sides of said coffee receptacle, and a retaining member, said retaining member adapted to extend across the cover and having its opposite ends engageable with the upper ends of the said strap members for securing said cover in place upon the receptacle.

4. In a device of the character described, an inner and outer receptacle, a cover for each of said receptacles, a bolt, means for securing said covers on opposite ends of said bolt in spaced fixed relation with respect to one another, a hasp member rotatable on said bolt between said covers, and means carried by the inner receptacle adapted to be engaged by said hasp for retaining the cover of said inner receptacle in position on said inner receptacle.

In testimony whereof I affix my signature.

CARRIE MITCHELL.